Nov. 24, 1959 — A. V. WILSON — 2,913,923
AUTOMOTIVE VEHICLE STEERING WHEEL
Filed May 10, 1955

INVENTOR.
Arthur Van Wilson

United States Patent Office 2,913,923
Patented Nov. 24, 1959

2,913,923

AUTOMOTIVE VEHICLE STEERING WHEEL

Arthur Van Wilson, Waterloo, Iowa

Application May 10, 1955, Serial No. 507,348

3 Claims. (Cl. 74—552)

This invention relates to the steering wheels of automotive vehicles such as automobiles, trucks and like, and more particularly to a non-shock one.

Almost all types of vehicles have steering wheels, usually constructed of metal and plastic material. Such steering wheels are uncomfortable to grasp with the the hands because due to their rigid construction road shocks experienced by the front wheels of the vehicle are transferred to the hands, arms and shoulders of the driver. Also such steering means is dangerous to the safety of the user in case of vehicle accidents. Furthermore, the rigid impervious steering wheel is difficult to grasp and manipulate when the hands are sweaty. Still a further objection to present type steering wheels is that they are often too cold to grasp with the bare hands in winter and often too hot to be grasped in the summer time.

Therefore, one of the principal objects of my invention is to provide an easily grasped resilient pneumatic steering wheel.

A further object of this invention is to provide a vehicle steering wheel that absorbs a maximum of road shocks before reaching the hands of the driver.

A still further object of my invention is to provide a vehicle steering wheel that may be grasped with comfort in both cold and hot weather.

A still further object of this invention is to provide a steering wheel that is soft and resilient to the body in case of a vehicle crash.

A still further object of this invention is to provide a steering wheel that slightly compresses under pressure from the hand of the driver, thereby making far more effective grasp control of the wheel.

Still further objects of my invention are to provide a vehicle steering wheel that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Figure 1:
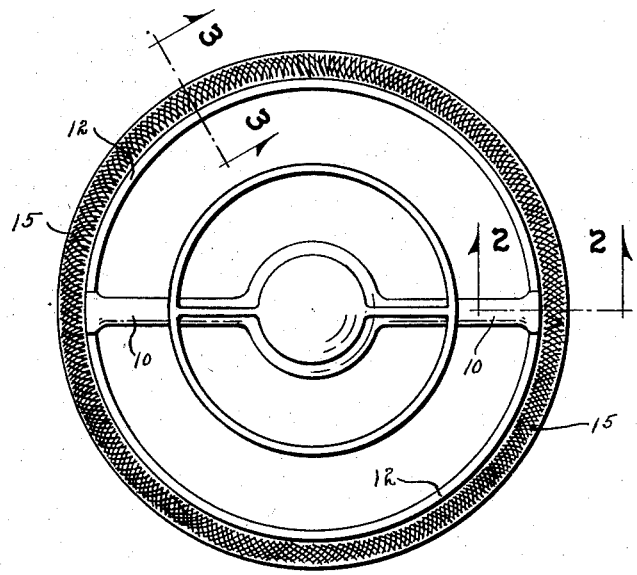
Fig. 1 is a top plan view of my pneumatic steering wheel.
Figures 2, 3:
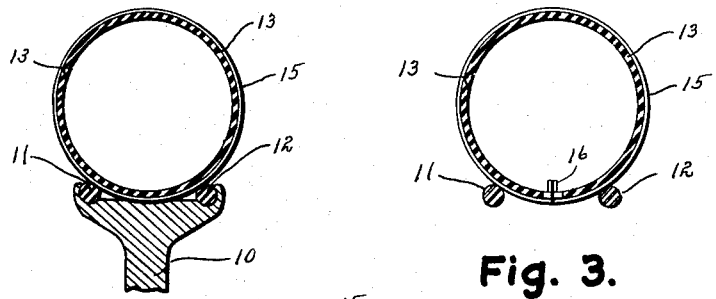
Fig. 2 is a cross sectional view of the device taken on line 2—2 of Fig. 1 and more fully illustrates its construction.
Fig. 3 is a cross sectional view of the steering wheel taken on line 3—3 of Fig. 1, and shows one type of air valve for inflating the rim casing.
Figure 4:
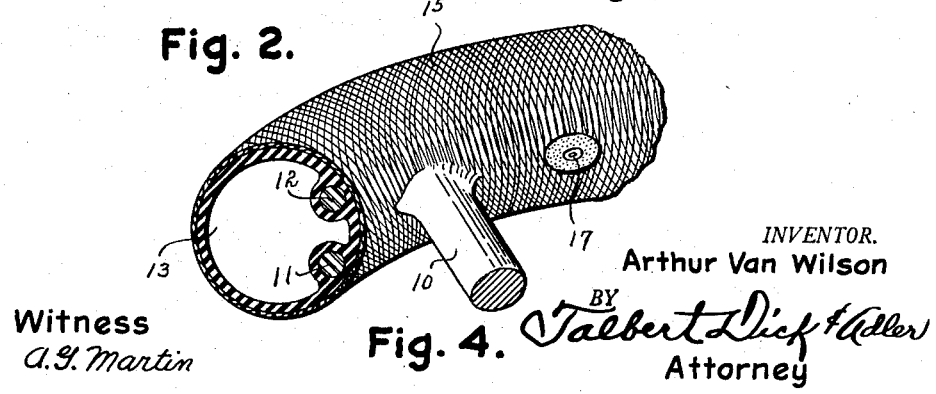
Fig. 4 is a perspective view of a section of a modified form of construction of my steering wheel.

Present day steering wheels have spokes leading to the wheel rim, usually two or three in number. In the drawings I use the numeral 10 to designate such spokes or cross supporting bar. It is to such a part or parts that I secure my steering wheel rim and which I will now describe in detail. I first use two spaced apart spring metal rings 11 and 12. These two rings are secured to the outer ends of members 10 by any suitable means. The metal ring 12 is spaced directly above the ring 11, and both rings are preferably of the same diameter. These two rings have a pneumatic tube 13 embracing them and extending between them. In the form shown in Figs. 1, 2 and 3, this endless tube 13, due to its circular construction in cross section, extends not only between the two metal spring rings but arcs inwardly between them. Therefore, the inside diameter of the endless tube wheel is slightly less than the outside diameters of the metal rings, as shown in Fig. 2. Obviously, when the tube 13 is inflated it will be held onto the rings similar to that of a pneumatic tire on the rim wheel of a vehicle. However, additional means may be employed to secure it to the rings, such as cement, clamps or like. One of the best methods is to mold the tube around each of the two metal rings, as shown in Fig. 4. When this construction is used, the resilient endless pneumatic tube wheel is rigidly and permanently fixed onto the two metal rings 11 and 12. In either structure, the tube 13 may consist of an outer casing and an inner tube or it may consist of merely a rubber of like casing, similar to that of a bicycle tire. The cross diameter of the tube 13 is considerably greater than that of the distance between the two metal rings so that the metal rings will be well to the inner side of the pneumatic wheel 13, as shown in Fig. 3. Such an arrangement makes possible the manual grasping of the wheel with only slight interference from the metal rings. In Fig. 4, the metal rings are inside the cross periphery of the wheel and therefore completely out of contact with the hands. While the tubular wheel 13 may be of flexible resilient material, I prefer to have an outer skin 15 of fabric or like. Such a skin is pleasant to the touch, frictionally engages the hands of the user, and absorbs perspiration. Also the wheel never gets too hot or too cold for the driver's hand.

The spring rings absorb some road shock, but mainly the shock is absorbed by the resilient pneumatic wheel portion 13. By the wheel 13 being resilient, any grasping pressure will tend to depress and compress it at that area, thus making for a firmer grip against relative movement between the hand and steering wheel. In case of a vehicle accident the pneumatic wheel will resiliently engage the chest of the user and eliminate many serious body injuries. Due to the ease of grasping, steering is made easier and therefore more efficient resulting in better control of the vehicle and less accidents. Also there is far less fatigue to the driver by the use of my steering wheel.

The wheel tire may be adjustably inflated to the desired pressure the same as any traction tire. The tube 13 may have an air inlet valve 16, as shown in Fig. 3, located out of the way between the two metal rings, or if desired the tube wheel may have a self-sealing rubber valve 17. When the latter is employed the tire is inflated by an ordinary football pump having a penetrating needle.

Some changes may be made in the construction and arrangement of my automotive vehicle steering wheel without departing from the real spirit and purpose of my invention, and it is my intention to cover by my claims, any modified forms of structure or use of mechanical equivalents which may be reasonably included within their scope.

I claim:

1. In a steering wheel, a steering wheel cross member; two spring rod metal rings spaced apart independent of each other and secured to said cross member, and a pneumatic steering tube wheel supported on and by said metal rings and having said metal rings imbedded in its side wall.

2. In a steering wheel, a steering wheel cross member; two spring rod metal rings secured to said cross member, and a pneumatic steering tube wheel supported on and by said metal rings and having said metal rings imbedded in its inner diameter side wall.

3. In a steering wheel, a steering wheel cross member; two spring rod metal rings secured to said cross member, and a pneumatic steering tube wheel supported on and by said metal rings and having said metal rings positioned at its inner diameter side wall.

References Cited in the file of this patent

UNITED STATES PATENTS

| | | |
|---|---|---|
| 548,117 | Duryea | Oct. 15, 1895 |
| 587,388 | Conard | Aug. 3, 1897 |
| 702,381 | Seddon | June 10, 1902 |
| 949,297 | Frentzen | Feb. 15, 1910 |
| 1,854,780 | Bronson | Apr. 19, 1932 |
| 1,984,033 | Ritchie | Dec. 11, 1934 |
| 2,185,568 | Ratner | Jan. 2, 1940 |
| 2,685,214 | Maud | Aug. 3, 1954 |

FOREIGN PATENTS

| | | |
|---|---|---|
| 596,881 | France | Aug. 17, 1925 |